US012719769B2

(12) United States Patent
Gustavsson

(10) Patent No.: US 12,719,769 B2
(45) Date of Patent: Aug. 25, 2026

(54) ARCHITECTURE FOR NETWORK ENTITY AND EVENT MODELS

(71) Applicant: Axellio Inc., Colorado Springs, CO (US)

(72) Inventor: Bo David Gustavsson, Monument, CO (US)

(73) Assignee: AXELLIO INC., Colorado Springs, CO (US)

( * ) Notice: Subject to any disclaimer, the term of this patent is extended or adjusted under 35 U.S.C. 154(b) by 525 days.

(21) Appl. No.: 18/170,256

(22) Filed: Feb. 16, 2023

(65) Prior Publication Data

US 2023/0261956 A1 Aug. 17, 2023

Related U.S. Application Data

(60) Provisional application No. 63/310,924, filed on Feb. 16, 2022.

(51) Int. Cl.

| | |
|---|---|
| ***H04L 43/04*** | (2022.01) |
| ***G06N 3/0455*** | (2023.01) |
| ***G06N 3/0499*** | (2023.01) |
| ***G06N 3/0985*** | (2023.01) |
| ***H04L 43/02*** | (2022.01) |

(52) U.S. Cl.

CPC ........... *H04L 43/04* (2013.01); *G06N 3/0455* (2023.01); *G06N 3/0499* (2023.01); *G06N 3/0985* (2023.01); *H04L 43/02* (2013.01)

(58) Field of Classification Search

CPC ....... H04L 43/04; H04L 43/02; H04L 43/028; H04L 41/142; H04L 41/145; H04L 41/16; G06N 3/0455; G06N 3/0499; G06N 3/0985; G06N 3/088; G06N 20/00

See application file for complete search history.

(56) References Cited

U.S. PATENT DOCUMENTS

| | | | |
|---|---|---|---|
| 6,871,265 | B1 | 3/2005 | Oren et al. |
| 7,639,613 | B1 | 12/2009 | Ghannadian et al. |
| 7,855,967 | B1 | 12/2010 | Rangavajjhala et al. |

(Continued)

FOREIGN PATENT DOCUMENTS

| | | | |
|---|---|---|---|
| EP | 3223495 | A1 | 9/2017 |
| EP | 3223495 | B1 | 9/2017 |

(Continued)

OTHER PUBLICATIONS

Extended European Search Report, European Application No. 21814324.6 dated Dec. 19, 2023, 13 pages.

(Continued)

*Primary Examiner* — Schquita D Goodwin
(74) *Attorney, Agent, or Firm* — Quarles & Brady LLP

(57) ABSTRACT

A system includes at least one processor, and a non-transitory computer readable medium in communication with the processor, the non-transitory computer readable medium having encoded thereon a set of instructions executable by the processor to obtain a stream of captured network traffic, extract entity information from the captured network traffic, generate event based on entity information extracted from the captured network traffic, generate a vector based, at least (Continued)

in part, on the entity information and event, and determine whether at least part of the captured network traffic is anomalous.

20 Claims, 11 Drawing Sheets

(56) References Cited

U.S. PATENT DOCUMENTS

| | | | | |
|---|---|---|---|---|
| 9,210,090 | B1 | 12/2015 | Baldi et al. | |
| 9,978,451 | B2 | 5/2018 | Pus et al. | |
| 10,410,135 | B2 | 9/2019 | Shumpert | |
| 10,652,281 | B1 | 5/2020 | Moolenaar et al. | |
| 11,030,884 | B1 | 6/2021 | Levy | |
| 11,494,189 | B2 | 11/2022 | Crupnicoff et al. | |
| 11,616,708 | B1 * | 3/2023 | Chraim | H04L 43/10 709/238 |
| 12,088,611 | B1 * | 9/2024 | Lin | H04L 63/20 |
| 2009/0168648 | A1 | 7/2009 | Labovitz et al. | |
| 2011/0125749 | A1 | 5/2011 | Wood et al. | |
| 2014/0122874 | A1 | 5/2014 | Janakiraman et al. | |
| 2015/0347255 | A1 | 12/2015 | Lippett et al. | |
| 2016/0019466 | A1 | 1/2016 | Lightner et al. | |
| 2016/0248655 | A1 | 8/2016 | Francisco et al. | |
| 2018/0278629 | A1 | 9/2018 | McGrew et al. | |
| 2019/0213488 | A1 | 7/2019 | Zou | |
| 2020/0007934 | A1 * | 1/2020 | Ortiz | H04N 21/25883 |
| 2020/0019543 | A1 * | 1/2020 | Wang | G06F 16/2379 |
| 2020/0044921 | A1 | 2/2020 | Srinivas et al. | |
| 2020/0250477 | A1 | 8/2020 | Barthur | |
| 2020/0319929 | A1 * | 10/2020 | Schreter | G06F 9/5016 |
| 2021/0037037 | A1 | 2/2021 | Oliner et al. | |
| 2021/0377133 | A1 | 12/2021 | Gustavsson | |
| 2022/0078205 | A1 * | 3/2022 | Bjarnason | H04L 63/1425 |
| 2022/0214902 | A1 * | 7/2022 | Zhao | H04L 9/3236 |
| 2022/0327377 | A1 * | 10/2022 | Harpaz | G06N 3/08 |
| 2022/0385635 | A1 * | 12/2022 | Thimmisetty | G06F 18/23 |
| 2023/0261957 | A1 | 8/2023 | Gustavsson | |
| 2023/0325242 | A1 * | 10/2023 | Booss | G06F 12/0882 718/104 |
| 2024/0250886 | A1 * | 7/2024 | Eng | H04L 43/04 |

FOREIGN PATENT DOCUMENTS

| | | | |
|---|---|---|---|
| WO | WO-2013-070631 | A1 | 5/2013 |
| WO | WO-2021-243052 | A1 | 12/2021 |
| WO | WO-2023-159126 | A1 | 8/2023 |
| WO | WO-2023-159128 | A1 | 8/2023 |

OTHER PUBLICATIONS

Yu et al., "dShark: A General, Easy to Program and Scalable Framework for Analyzing In-network Packet Traces," 16th USENIX Symposium on Networked Systems Design and Implementation, pp. 207-220 (Year: 2019), 14 pages.

International Preliminary Report on Patentability, International Application No. PCT/US2023/062739 mailed on Aug. 20, 2024, 5 pages.

International Preliminary Report on Patentability, International Application No. PCT/US2023/062743 mailed on Aug. 20, 2024, 6 pages.

International Search Report and Written Opinion, International Application No. PCT/US21/34574 dated Sep. 16, 2021, 10 pages.

International Application No. PCT/US21/34574 Publication Notice, dated Dec. 2, 2021, 1 page.

U.S. Appl. No. 17/332,487 Publication Notice, dated Dec. 2, 2021, 1 page.

International Preliminary Report on Patentability, International Application No. PCT/US21/34574 dated Dec. 8, 2022, 6 pages.

U.S. Appl. No. 17/332,487 Non-Final Office Action dated Feb. 7, 2023, 58 pages.

Smekal et al., "An FPGA-based Priority Packet Queues", Brno University of Technology, The Faculty of Electrical Engineering and Communication, 5 pages. (Year: 2019).

Jan Kubalek, "High-speed DMA packet transfer in system DPDK", in Excel@FIT 2018, 7 pages. (May 2018).

International Search Report and Written Opinion, International Application No. PCT/US23/62739 dated May 30, 2023, 8 pages.

International Search Report and Written Opinion, International Application No. PCT/US23/62743 dated May 31, 2023, 8 pages.

Nadun Rajasinghe, 'INSecS: An Intelligent Network Security System', In: The University of Western Ontario, A thesis submitted in partial fulfillment of the requirements for the degree in Master of Engineering Science, Aug. 15, 2018, 93 pages.

Anand Ravindra Vishwakarma, 'Network Traffic Based Botnet Detection Using Machine Learning', In: San Jose State University, Master's Theses and Graduate Research, May 18, 2020, 67 pages.

U.S. Appl. No. 17/332,487, Notice of Allowance, dated Aug. 9, 2023, 26 pages.

Extended European Search Report, corresponding to EP 23757088.2, dated Dec. 17, 2025.

Nguyen, Thien Duc, et al. "DÏoT: A federated self-learning anomaly detection system for IoT." 2019 IEEE 39th International conference on distributed computing systems (ICDCS). IEEE, 2019.

Extended European Search Report, corresponding to 23757089.0, dated Dec. 19, 2025.

* cited by examiner

Figure 2B:
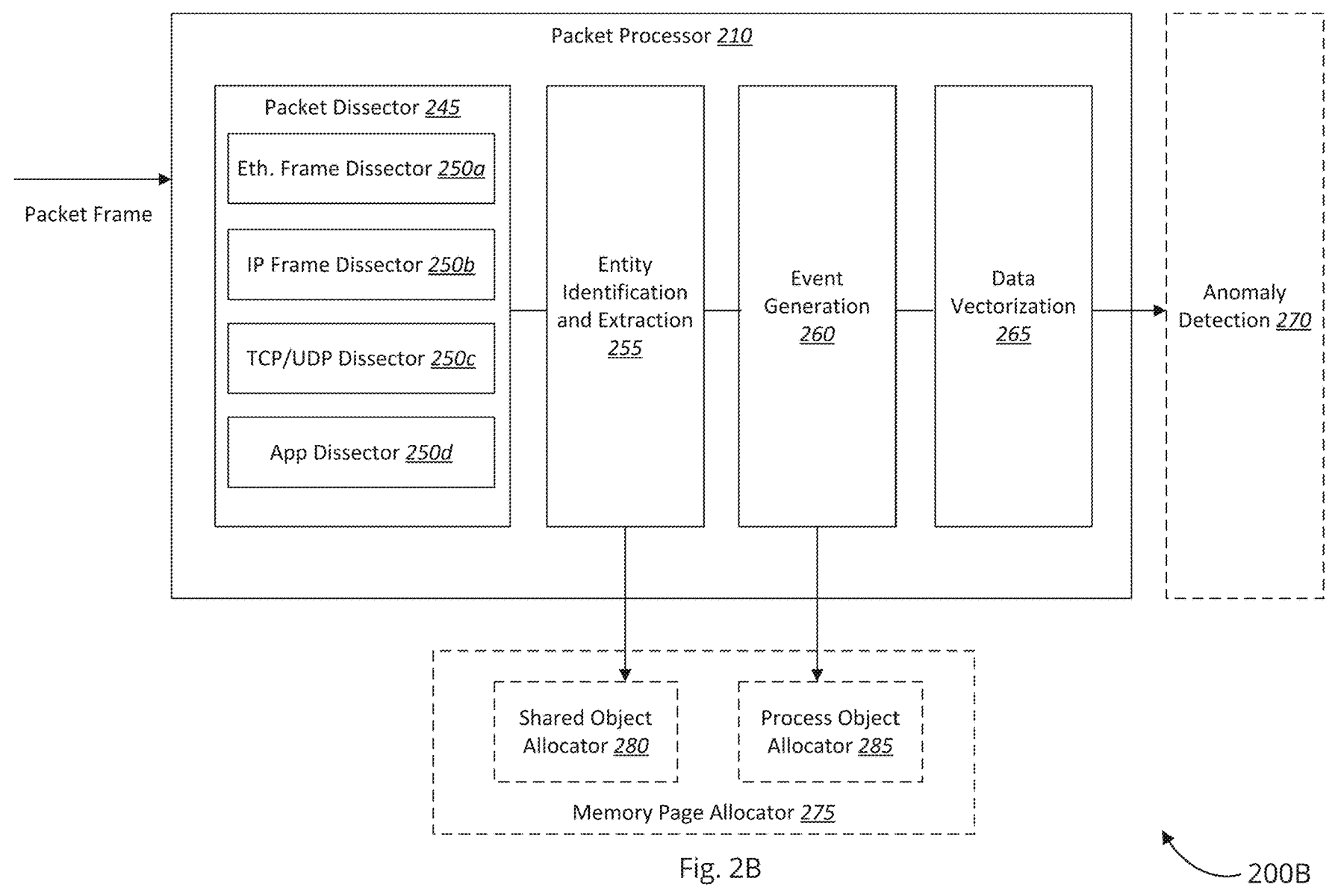

Anomaly Detection 270

Packet Processor 210

Data Vectorization 265

Event Generation 260

Entity Identification and Extraction 255

Packet Dissector 245

Eth. Frame Dissector 250a

IP Frame Dissector 250b

TCP/UDP Dissector 250c

App Dissector 250d

Packet Frame

Memory Page Allocator 275

Process Object Allocator 285

Shared Object Allocator 280

ARCHITECTURE FOR NETWORK ENTITY AND EVENT MODELS

CROSS-REFERENCES TO RELATED APPLICATIONS

This application claims priority to U.S. Patent Application Ser. No. 63/310,924 (the "'924 Application"), filed Feb. 16, 2022, entitled, "Detection of Malicious Network Traffic Based on Classification of Packets," and may be related to U.S. patent application Ser. No. 18/170,281 filed Feb. 16, 2023, entitled, "Framework for Anomaly Detection with Dynamic Model Selection", International Patent Application Ser. No. PCT/US23/62743 filed Feb. 16, 2023, entitled, "Framework for Anomaly Detection with Dynamic Model Selection," and International Patent Application Ser. No. PCT/US23/62739, filed Feb. 16, 2023 entitled, "Architecture for Network Entity and Event Models," the disclosures of which are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for network monitoring and packet analysis.

BACKGROUND

In today's networking environments, network monitoring and security systems are typically overwhelmed by the number of entities and the volume of data being communicated. Conventional approaches to real-time network monitoring and traffic analysis are typically limited to data contained in packet headers or in metadata, and fail to capture payload data contained within individual packets. Furthermore, to support real-time monitoring capabilities, multiple machines are dedicated to network monitoring and packet analysis alongside high-speed storage devices. These approaches are resource intensive with high computational demands.

Accordingly, methods, systems, and apparatuses for implementing an architecture for network entity and event models are provided. Specifically, a more efficient, dynamically scalable models for network entities and events is set forth below.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIG. 2B is a schematic diagram of packet processing logic in the packet analytics architecture, in accordance with various embodiments;

DETAILED DESCRIPTION OF EMBODIMENTS

Figure 1:
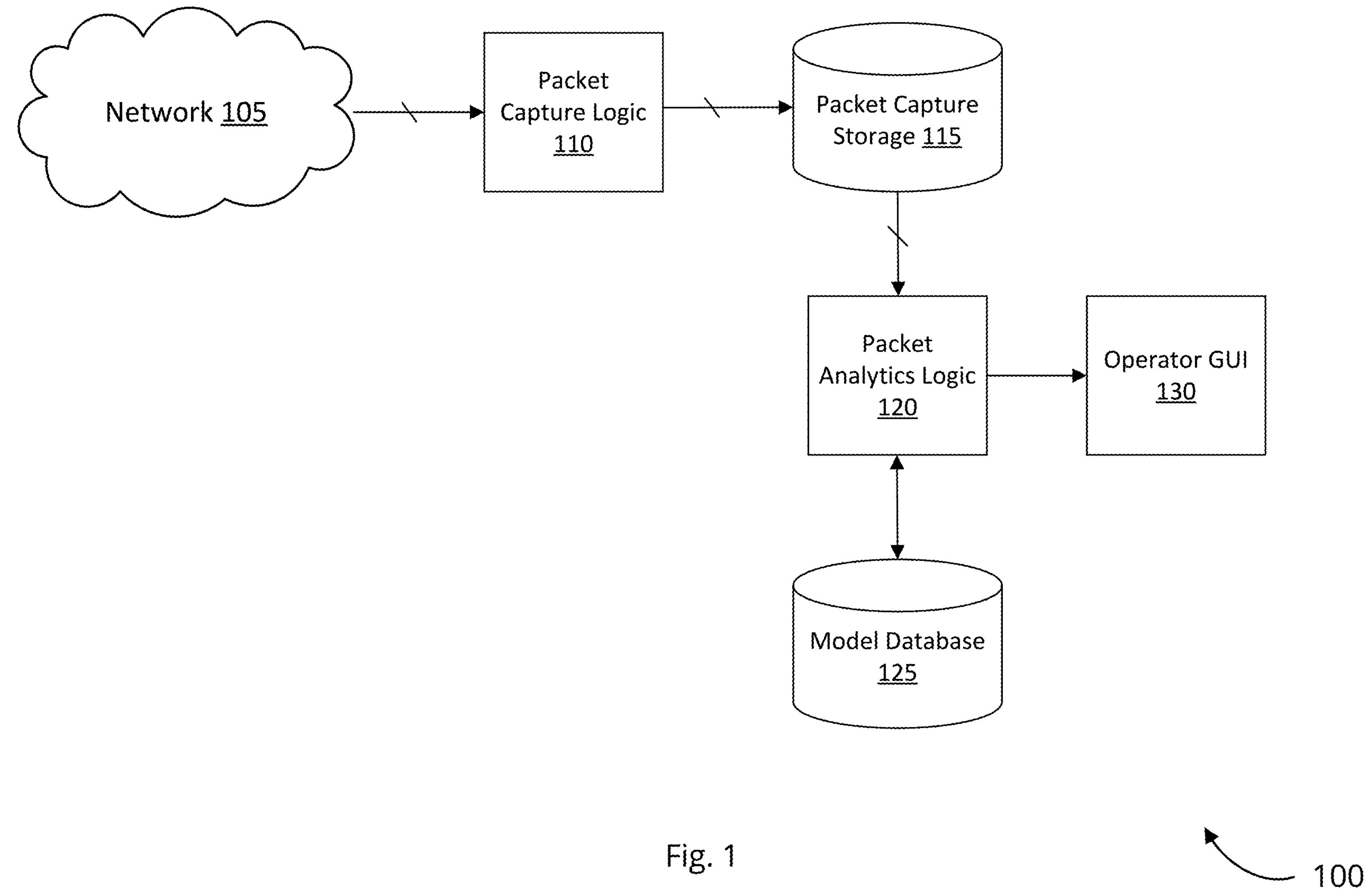
FIG. 1 is a schematic block diagram of a system for a network entity and event model architecture, in accordance with various embodiments.

Various embodiments set forth systems, methods, and apparatuses for implementing an architecture for network entity and event models.

In some embodiments, a system for an architecture for network entity and event models is provided. A system includes at least one processor, and a non-transitory computer readable medium in communication with the processor, the non-transitory computer readable medium having encoded thereon a set of instructions executable by the processor to perform various functions. The set of instructions may be executed by the processor to obtain a stream of captured network traffic, extract entity information from the captured network traffic, and generate event based on entity information extracted from the captured network traffic. The set of instructions may further be executed by the processor to generate a vector based, at least in part, on the entity information and event, and determine whether at least part of the captured network traffic is anomalous.

In further embodiments, an apparatus for an architecture for network entity and event models is provided. The apparatus includes a non-transitory computer readable medium in communication with a processor, the non-transitory computer readable medium having encoded thereon a set of instructions executable by the processor to perform various functions. The set of instructions may be executed by the processor to obtain a stream of captured network traffic, extract entity information from the captured network traffic, and generate event based on entity information extracted from the captured network traffic. The set of instructions may further be executed by the processor to generate a vector based, at least in part, on the entity information and event, and determine whether at least part of the captured network traffic is anomalous.

In further embodiments, a method for an architecture for network entity and event models is provided. The method includes obtaining a stream of captured network traffic, extracting entity information from the captured network traffic, and generating event based on entity information extracted from the captured network traffic. The method further includes generating a vector based, at least in part, on the entity information and event, and determining whether at least part of the captured network traffic is anomalous.

In the following description, for the purposes of explanation, numerous details are set forth to provide a thorough understanding of the described embodiments. It will be apparent to one skilled in the art, however, that other embodiments may be practiced without some of these details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

When an element is referred to herein as being "disposed" in some manner relative to another element (e.g., disposed on, disposed between, disposed under, disposed adjacent to, or disposed in some other relative manner), it is to be understood that the elements can be directly disposed relative to the other element (e.g., disposed directly on another element), or have intervening elements present between the elements. In contrast, when an element is referred to as being "disposed directly" relative to another element, it should be understood that no intervening elements are present in the "direct" example. However, the existence of a direct disposition does not exclude other examples in which intervening elements may be present.

Moreover, the terms left, right, front, back, top, bottom, forward, reverse, clockwise and counterclockwise are used for purposes of explanation only and are not limited to any fixed direction or orientation. Rather, they are used merely to indicate relative locations and/or directions between various parts of an object and/or components.

Furthermore, the methods and processes described herein may be described in a particular order for ease of description. However, it should be understood that, unless the context dictates otherwise, intervening processes may take place before and/or after any portion of the described process, and further various procedures may be reordered, added, and/or omitted in accordance with various embodiments.

Unless otherwise indicated, all numbers used herein to express quantities, dimensions, and so forth should be understood as being modified in all instances by the term "about." In this application, the use of the singular includes the plural unless specifically stated otherwise, and use of the terms "and" and "or" means "and/or" unless otherwise indicated. Moreover, the use of the terms "including" and "having," as well as other forms, such as "includes," "included," "has," "have," and "had," should be considered non-exclusive. Also, terms such as "element" or "component" encompass both elements and components comprising one unit and elements and components that comprise more than one unit, unless specifically stated otherwise.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items. By way of example, the phrases "at least one of A, B, and C" or "at least one of A, B, or C" each refer to only A, only B, or only C; and/or any combination of A, B, and C. In instances where it is intended that a selection be of "at least one of each of A, B, and C," or alternatively, "at least one of A, at least one of B, and at least one of C," it is expressly described as such.

In conventional network monitoring and packet analysis, traffic is typically analyzed at ingress and egress points to the network. For example, packets entering a network and leaving the network may be monitored by and analyzed by gateway devices at the edge of a network. While some systems may be able to further analyze traffic internal to the network, this is typically hardware and resource intensive. Moreover, typical systems solely focus on data contained within a packet header and/or metadata related to the traffic.

Accordingly, an entity model and event model is set forth in which an entity model and event model are generated from traffic that is communicated both internally and/or externally to a network. Moreover, the entity model and event model may respectively include information extracted from a packet's data (e.g., payload), and associate an entity and/or event with a timestamp and/or a time window. Each captured packet within the network can then be vectorized based on the entity model and/or event models for real-time analysis and anomaly detection. Thus, improvements to real-time network monitoring and anomaly detection may be realized.

FIG. 1 is a schematic block diagram of a system 100 for an architecture for network entity and event models, in accordance with various embodiments. The system 100 includes a network 105, packet capture logic 110, packet capture storage 115, packet analytics logic 120, model database 125, and operator GUI 130. It should be noted that the various components of system 100 are schematically illustrated in FIG. 1, and that modifications to the various components and other arrangements of system 100 may be possible and in accordance with the various embodiments.

In various embodiments, the network 105 may include a communication network comprising a plurality of entities. The network 105 may include various types of communication networks as known to those skilled in the art. Specifically, the network 105 may include, without limitation, a local area network (LAN), wireless local area network (WLAN), a wide area network (WAN), wireless wide area network (WWAN), the Internet, a cloud network (e.g., enterprise cloud, public cloud, private cloud, etc.), or other suitable network.

Logic, as used herein, may include hardware, software (including firmware), or both hardware and software. For example, hardware logic may include logic circuits, programmable logic, field programmable gate array (FPGA), application specific integrated circuit (ASIC), or other suitable hardware based logic. Accordingly, system 100 may include logic, as described above, which further includes packet capture logic 110 and packet analytics logic 120.

In various embodiments, the packet capture logic 110 may be configured to capture packets on the network 105. In some examples, the packet capture logic 110 is configured to capture all traffic communicated between entities within the network 105, traffic entering network 105 (e.g., to entities within the network 105 from outside of the network 105), and/or traffic exiting the network 105 (e.g., traffic communicated by entities within the network 105 to a destination outside of the network 105). As used herein, an entity is a network entity (interchangeably referred to as a logical entity) as known to those skilled in the art. Specifically, a network 105 is defined by a set of network entities. Thus, in various examples, an entity may include, without limitation, a device, virtual machine instance, port (e.g., a network interface card (NIC) port), or virtual port (e.g., a virtual network interface). In further examples, entities may include further logical entities, including, for example, applications, users, digital certificates, files transferred across a network, etc.

In various examples, the packet capture logic 110 may include all or part of a packet capture system as described in U.S. patent application Ser. No. 17/332,487, filed on May 27, 2021, the entirety of which is herein incorporated by reference. Specifically, the packet capture logic 110 may be configured to capture packets communicated on network 105 in real-time or near real-time speeds (e.g., 100 or more gigabits per second (Gbps)). For example, in some embodiments, the packet capture logic 110 may be configured to capture packets at a rate of 100 Gbps, and store the captured packets in packet capture storage 115. In some examples, network traffic is captured via a Test Access Point (TAP) or switched port analyzer (SPAN) port, then filtered, deduplicated, sliced, and timestamped at nanoseconds granularity. The captured traffic may then be compressed for storage.

In various examples, packet capture storage 115 may include one or more storage devices configured to store the captured packets from packet capture logic 110 in real-time or near real-time (including propagation delay, processing delay, etc.). Accordingly, the packet capture storage 115 may include, without limitation, one or more disk drives, solid state storage, or other storage devices. In some examples, the captured packets may be stored without dividing the network traffic via a load balancer. In other words, the entire undivided network traffic stream may be ingested and/or stored by the packet capture storage 115.

In various embodiments, packets may be persisted in a time series file system, in packet capture (PCAP) format via a virtual NIC. The file system of the packet capture storage 115 may be configured as a buffer which can feed PCAP files at high speed without losing packets. PCAP extraction can filter stored packets by utilizing a Berkeley Packet Filter (BPF).

In some embodiments, packet analytics logic 120 may be configured to obtain the stored PCAP files from packet capture storage 115 for analysis. In some examples, the packet analytics logic 120 may include, without limitation, one or more packet load balancers, and one or more packet processors, where the one or more packet load balancers are configured to distribute streams of captured network traffic (e.g., PCAP streams) according to a distribution scheme. In some examples, the streams of captured network traffic may be distributed such that all packets associated with the same connection between two applications are directed to a common receiver (e.g., packet processor). Thus, respective packet processors of the one or more packet processors may receive captured network traffic associated with a respective connection. In other examples, the streams of captured network traffic may be distributed evenly among the one or more packet processors.

The packet analytics logic 120 may further include, in some examples, logic for entity classification, event generation, packet vectorization, and/or anomaly detection. The details of the packet analytics logic 120 architecture is described in greater detail below with respect to FIGS. 2A & 2B.

In some embodiments, entity classification may include extracting entity information from a packet. The packet may be captured from training data (e.g., historic traffic flow records, a pre-existing data set, etc.), or captured as raw packet data in real-time (e.g., real-time network traffic). The captured packets, as previously described, may be stored as compressed PCAP files.

Accordingly, in some examples, entity information may be extracted from the PCAP data (e.g., data from or contained in PCAP files). The packet analytics logic 120 may, for example, be configured to decode the PCAP files (also referred to as PCAP extraction) to obtain PCAP data, such as raw packet data, metadata (e.g., events, logs, flows), and/or entity information associated with the packet. Entity information is information that is extracted from the packet that is associated with an entity. For example, entity information may include, without limitation, a media access control (MAC) address, NIC port, endpoint (e.g., a network endpoint, such as a user equipment, modem, gateway, switch, router, etc.) and endpoint configuration information, group information, user information (e.g., a user or username, etc.), VLAN information, IP configurations (e.g., TCP/IP settings, gateway information, etc.), DHCP settings, connection statistics (e.g., the number of clients connected, how long as entity been on the network, when the entity was first identified, timestamp information associated with the entity, etc.), applications, application protocol-specific information (e.g. communication protocols utilized by an application), related network node information, and packet payload information. In further examples, entity information may include further information regarding the entity, and is not limited to any information or set of information.

Based on the entity information, the packet analytics logic 120 may construct an entity model. The entity model may include an inventory of entities. The inventory of entities may be a collection of one or more entities, each respective entity defined by a set of entity information related to a respective. Thus, the inventory of entities may be a database, table, index, list, or other suitable collection of the one or more entities, each entity defined by respective sets of entity information. The entity model may further include inventories of specific types of entity information. For example, the entity model may further include, without limitation, an endpoint inventory, user inventory, NIC port inventory, etc. The entity model is described in further detail with respect to FIG. 3A.

In further embodiments, events may be generated based on interactions between entities, or alternatively, based on a single entity. For example, entity information extracted from packets and/or PCAP files may include entity information associated with multiple entities. For example, the entity information may indicate an originating entity and one or more destination entities (e.g., endpoints or other entity information associated with the destination). Based on this information, an event may be generated between two or more entities. In other embodiments, and event may be generated based on a single entity. For example, an entity may be a file, and an event may be associated with the file. The event, in some examples, may be that a virus was detected on the file.

In various embodiments, an event may be defined based on a set of event information. Event information may include, without limitation, information about a connection event, such as a domain name server (DNS) connection, dynamic host configuration protocol (DHCP) connection, hypertext transfer protocol (HTTP) connection, user datagram protocol (UDP) connection, transmission control protocol (TCP) connection, internet protocol (IP) connection, server message block (SMB) connection, and/or quick UDP internet connection (QUIC) connection.

Based on the event information, the packet analytics logic 120 may construct an event model. As described previously with respect to the entity model, the event model may include an inventory of events. The event model is described in further detail with respect to FIG. 3B.

In various embodiments, the entity model and event model may be associated with a timestamp or window of time. Specifically, each packet may be timestamped during packet capture, and entity information extracted from each packet, and further, events generated from the entity information, may be associated with the time stamp. Accordingly, the entity and event models may be configured to contain information over a window of time (e.g., 1 second, several seconds, or a fraction of a second, etc.). In some examples, the window of time may be user definable based on performance requirements and/or storage requirements. Thus, respective databases may be created for entity and event models at respective time windows. The time model is described in further detail below with respect to FIGS. 3C & 3D.

In various embodiments, the entity model, event model, and/or time model may accordingly be stored in model database 125. In some examples, the model database 125 may include one or more respective databases associated with respective time windows, as previously described. The model database 125 may be implemented as one or more storage devices. The model database 125 may, for example, be implemented on a hard drive, memory device, or both. Model database 125 may be configured to store In various embodiments, based on entity information and events, a vector may be generated. In some examples, the vector is a behavior vector generated based on the event and entities associated with a packet (or one or more packets). Thus, the behavior vector is, in some examples, a multi-dimensional vector generated based on the entities and events associated with a packet.

In various examples, one or more machine learning (ML) engines may be configured to detect anomalous behavior based on the behavior vector. In some examples, a respective ML engine is utilized for anomaly detection in respective entities and/or events. An architecture for anomaly detection is described in greater detail below with respect to FIG. 4.

In some examples, one or more ML engines may utilize a clustering algorithm. Specifically, the ML model may compare the generated vector to trained vector clusters for the given event and/or entity. Thus, the clustering algorithm may group similar vectors together into clusters, and use the clusters to identify "normal" or expected behavior in the network traffic involving a given the event and/or entity associated with a respective packet.

In various examples, anomaly detection is based on a high-speed, vector segmentation algorithm which assigns each packet or flow record to a cluster based on its similarity to the other vectors in that cluster, and then detects malicious and/or anomalous traffic or behavior based on both distance and infrequency. In some examples, the anomaly detection may be implemented as logic. The anomaly detection logic may be configured to dynamically determine and adjust cluster counts and tune hyperparameters for respective ML models as further complexity is discovered in the traffic, with no need for manual hyperparameter tuning upfront. Specifically, inference time may be dynamically managed by adjusting dimensions and cluster counts for respective ML models. Accordingly, the anomaly detection logic may be configured to automatically tune its hyperparameters as it processes source data, with no need for manual hyperparameter tuning.

Hyperparameters are parameters of an ML model that control the learning process of the ML model. Hyperparameters may include, without limitation, the number of clusters, distance metric, frequency (or infrequency) of a vector, convergence threshold, initialization method, a maximum number of iterations, linkage method, density parameters, etc. In some examples, hyperparameters may further include, without limitation, topology and/or neural network size, the number of hidden layers in a neural network, learning rate, number of nodes in a respective layer, activation functions, regularization parameters.

Alternatively, in some examples, the ML engine may utilize a neural network for clustering, such as a multilayer perceptron (MLP), feed-forward network, encoder-decoder (including autoencoder), or transformer based neural network architecture. In yet further embodiments, the ML engine may utilize a density-based spatial clustering of applications with noise (DBSCAN) or hierarchical DBSCAN (HDBSCAN), k-single value decomposition (SVD) clustering, k-means clustering, or a hierarchical clustering algorithm, such as Agglomerative Clustering or Divisive Clustering. It is to be understood that the clustering algorithm is not limited to any single algorithmic approach, and suitable alternative algorithms may be used in other embodiments.

Figure 2A:
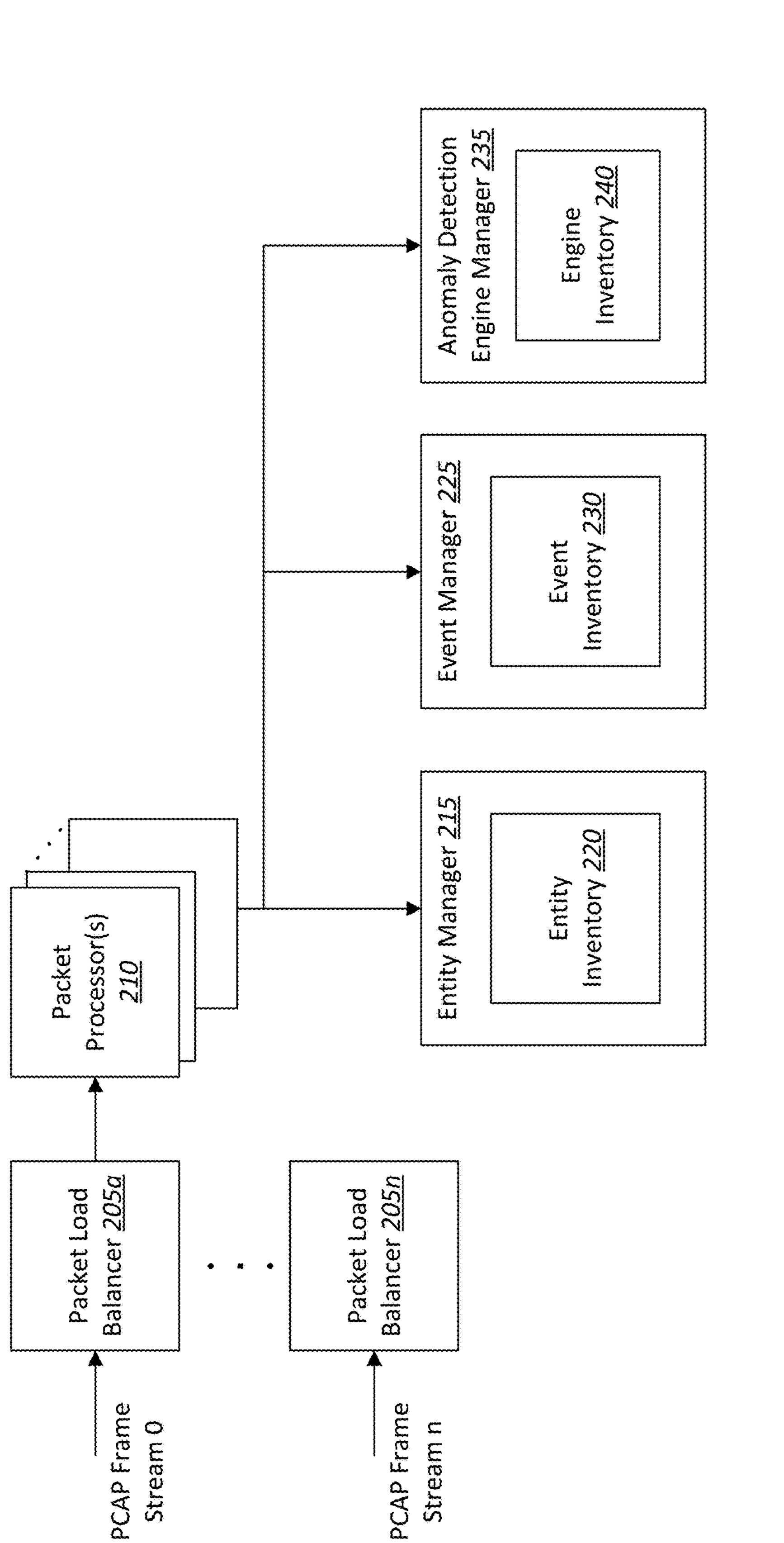
FIG. 2A is a schematic block diagram of a packet analytics architecture, in accordance with various embodiments.

FIG. 2A is a schematic block diagram of a packet analytics architecture 200A, in accordance with various embodiments. The packet analytics architecture may include one or more packet load balancers **205*a*-205*n*, one or more packet processors 210, entity manager 215, entity inventory 220, event manager 225, event inventory 230, anomaly detection engine manager 235, and engine inventory 240. It should be noted that the various components of the architecture 200A are schematically illustrated in FIG. 2A, and that modifications to the various components and other arrangements of the architecture 200**A may be possible and in accordance with the various embodiments.

In various embodiments, the architecture 200A is an architecture for packet analytics logic as previously described. Specifically, the packet analytics architecture 200A may obtain captured network traffic in streams. In some examples, the captured network traffic streams include PCAP frame streams. In further examples, the capture network traffic streams may include captured traffic in other forms, such as raw packet streams, Ethernet frame streams, etc. In some examples, a n-number of traffic streams may be obtained concurrently from storage (e.g., packet capture storage as previously described) to be processed in parallel by one or more respective packet processors 210.

Each packet processor of the one or more packet processors 210 may be configured to dissect a frame and/or packet, and extract protocol-specific information from the frame at each layer to identify an entity associated with the frame and/or packet. A packet processor is described in further detail below with respect to FIG. 2B.

Entity information extracted from the network traffic streams may be used to identify the entity, and the entity may be stored, via entity manager 215, in entity inventory 220. In some examples, entity information may be used to identify an entity from the entity inventory 220. In further examples, entity information may be used to update an existing entity in the entity inventory 220.

The one or more packet processor 210 may further be configured to create events based on conversations between entities (e.g., connections, interactions, and communications between two entities). Specifically, entity state information and statistics may be used to identify the event, and stored in event inventory 230 via the event manager 225. In some examples, an event may be generated based on rule-based data matching (e.g., information extracted from the packet is compared against a rule to generate an event).

The one or more packet processors 210 may further be configured to generate a vector (such as a behavior vector) based on the entity information and event, as previously described. In various examples, the vector may be fed to an anomaly detection engine manager 235 for anomaly detection. Specifically, anomaly detection engine manager 235 may be configured to select an anomaly detection engine from the engine inventory 240 for performing anomaly detection based on the vector, and specifically, based on the entity information and/or event associated with the vector.

For example, a vector may dynamically be assigned to an ML engine based on a connection, entity, event, or combination of different entity information and/or event. In some examples, all vectors associated with the same connection between two entities may be directed to a common ML engine and/or one or more ML engines. Thus, ML engine load may be managed and/or distributed for managed processing throughput of various Ml engines. In some examples, the ML engine manager 2305 may be configured to distribute vectors utilizing a closed-loop load distributions scheme as outlined above.

FIG. 2B is a schematic diagram of packet processing logic 200B in the packet analytics architecture, in accordance with various embodiments. Packet processing logic 200B includes a packet processor 210, packet dissector 245, Ethernet frame dissector 250*a*, IP frame dissector 250*b*, TCP/UDP dissector 250*c*, app dissector 250*d*, entity identification and extraction 255, event generation 260, data vectorization 265, anomaly detection 270, memory page allocator 275, shared object allocator 280, and process object allocator 285. It should be noted that the various components of the logic 200B are schematically illustrated in FIG. 2B, and that modifications to the various components and other arrangements of the logic 200B may be possible and in accordance with the various embodiments.

In various examples, one or more streams of PCAP frames may be obtained in parallel by the packet processing logic 200B. The PCAP frames may then be distributed to respective packet processors of the one or more packet processors 210 via packet load balancers 205*a*-205*n*.

The packet processor 210 is logic, as previously described, comprising several components, which may themselves be implemented in logic, for example, as software code. The packet processor 210 is configured to process a frame of the captured network traffic. Specifically, packet processor 210 may include a packet dissector 245 configured to dissect the frame and/or packet of captured network traffic. In some examples, the packet dissector 245 may dissect an Ethernet frame via Ethernet frame dissector 250*a* to produce an IP frame, which may further be dissected via the IP frame dissector 250*b* to produce a TCP/UDP frame, which may in turn be dissected via the TCP/UDP dissector 250*c* to produce an app frame (e.g., application-layer frame), which may in turn be dissected via the app dissector 250*d* to produce the data packet. With respect to the app dissector 250*d*, it is to be understood that many different kinds of dissector configurations may be implemented according to protocols and applications present in the network from which the captured network traffic is obtained. Thus, dissection of the packet is performed based on the protocols in the frame and/or packet. As the frame is dissected, protocol specific information is extracted to identify the entities associated in the packet via entity identification and extraction 255. As the entities are identified, they are added to the entity inventory database, for example, via a memory page allocator 275, which may place the entity in shared memory space via shared object allocator 280.

In various embodiments, a conversation between two entities generates an event, via event generation 260, where entity information, entity state, and statistics associated with the conversation are used to identify the event. As events are created, they may be inserted into a process specific time model, as will be described in further detail below with respect to FIGS. 3C & 3D. The time model is configured to facilitate identification of events across time. For each packet participating in a conversation, the conversation context is identified and updated. In some examples, inspection rules may be matched against the packet to generate rule-based events (e.g., events may be generated by satisfying conditions of a rule). Events may then be stored in an event inventory, which itself may be stored in a per process memory space by the process object allocator 285.

In various embodiments, the entity and event models may form the model database. The model database may be stored, at least in part, in memory, where the entity model and event model are allocated and stored in separate memory space. Database memory may be managed and as a contiguous set of mapped pages starting at a defined virtual memory location, where overall memory utilization is tracked and more pages are allocated as needed based on allocation scenarios using synchronization where needed to coordinate the allocations across parallel execution processes (e.g., threads). To more efficiently facilitate parallel processing in a multithreaded architecture, the database memory space is separated into two types of regions: shared memory space and per process memory space.

Shared memory space is a memory space where creation and manipulation of shared objects require synchronization of access between processing threads at the object level. Per process memory space is a memory space where a respective process owns the objects in this memory space and objects in this memory space can be accessed without synchronization. Synchronization refers to techniques for enforcing synchronization between process threads by allowing only a single process (or alternatively a single processing thread within the process) to access or modify an object. A chunk of memory is allocated for the region (e.g., shared memory space or per process memory space) when an object is allocated in the database. An object may be an instance of a class, in this case, of an entity and/or event, having an identifier and attributes (such as a state).

Shared objects (e.g., objects stored in shared memory space) are generally objects where there is only one instantiation over a longer time period (relative to per process objects), and is shared across several processes. Shared objects may include entities, or metadata tracking those entities.

Per process objects (e.g., objects stored in per process memory space) are generally objects that are created for a shorter time periods (relative to shared objects) and independent of the shared objects. Per process objects may include events generated by the behavior of the entities. In some examples, objects managed entirely by the packet processing thread may be allocated in a process specific memory block (e.g., in per process memory space) to avoid unnecessary synchronization-based restrictions to coordinate access. Process specific memory may be allocated in set increments (e.g., xKB sized chunks) to minimize contention in allocating an underlying memory chunk. A processing thread, as used herein, refers to a thread within a process (in this example, the process for executing the functions of logic such as packet analytics logic) that is able to operate within the memory allocated to the process and shared with other threads. Within the memory space, the thread may have access to shared memory space and its respective per process memory space.

In some examples, to facilitate a coupling between shared objects and per process objects, a "ProcPgPtrs" object may be assigned to a shared object. This ProcPgPtrs is a list of pointers that points into the per process space for each process that has an object associated with the shared object.

In various embodiments, behavior vectors may be created based on the conversation context, protocols, and entities involved that are fed to the anomaly detection logic 270. As used herein, context may include, for example, network addresses, packets, fingerprints, or other data that indicates association of a packet and/or event with a particular entity. Thus, the features extracted from the packet (or a subset of features) may be used to generate the vector (e.g., a behavioral vector) via data vectorization 265. The vector may be fed to anomaly detection 270 for further processing to detect anomalies, as will be further described below with respect to FIG. 4.

Each frame and its embedded networking protocols such as IP, TCP, and UDP may have a standardized set of header fields that define such characteristics as length of the packet, source and destination IP addresses, protocol and application use. By identifying and associating traffic with a specific entity or group of entities (e.g., an entity type), traffic can similarly be separated and stored in different types with similar behavior. For example, entity types may include, without limitation, endpoints (e.g., SMB servers, printers, IoT devices, VM instances), and applications (e.g., Chrome browsers, etc.) among others types of entities.

In some examples, each entity type may be assigned and stored with a select set of features meaningful for that type of entity, and each packet may then vectorized into an m-dimensional vector (e.g., m-number of features). In some embodiments, packets are classified and stored by protocol and entity, with each packet subsequently vectorized and assigned a cluster ID.

In some examples, one or more initial databases may be set up to store network traffic (e.g., packets) as packets enter the network. The one or more databases may be able to receive and store the one or more packets in parallel. The one or more databases may be set up to be baseline, "normal," or non-anomalous traffic data and as new data or new traffic enters the network, the new data may be compared against the data contained in the databases to detect anomalous network traffic.

In some examples, when storing the data in the databases, the packets and/or data associated with the packets may be stored based on (1) entity and (2) events (e.g., conversations, communications, etc.) that occur between entity types. The packets and/or data may also be stored with a timestamp. In some examples, the databases identify all entity types (e.g., software, endpoints (e.g., devices), applications, websites, etc.) that are communicating with each other via the packet data and store the packets and/or data based on entity type and event. The one or more events between entity types might create an event timeline of all communicating entities and actions that occurred within a conversation between entities.

In various embodiments, one or more databases may be continuously created as new network traffic enters the network to create one or more new baselines. As storage is used up in the one or more databases, the older traffic data may be deleted or removed to create new storage data and a new baseline. The one or more databases that are created based on entity and conversations between entity types may be used as the baseline to detect anomalous traffic with the network.

In some cases, the packets may be stored separately from the entity, entity event, and/or entity behavior (which may be a combination of entity type and event) information associated with the one or more packets. The entity type, event, and/or behavior (e.g., a combination of entity and event information) may be stored in reference to the packet data so that if an anomalous entity, anomalous event, and/or anomalous behavior is detected, the packets can be retrieved for further analysis.

Figure 3A:
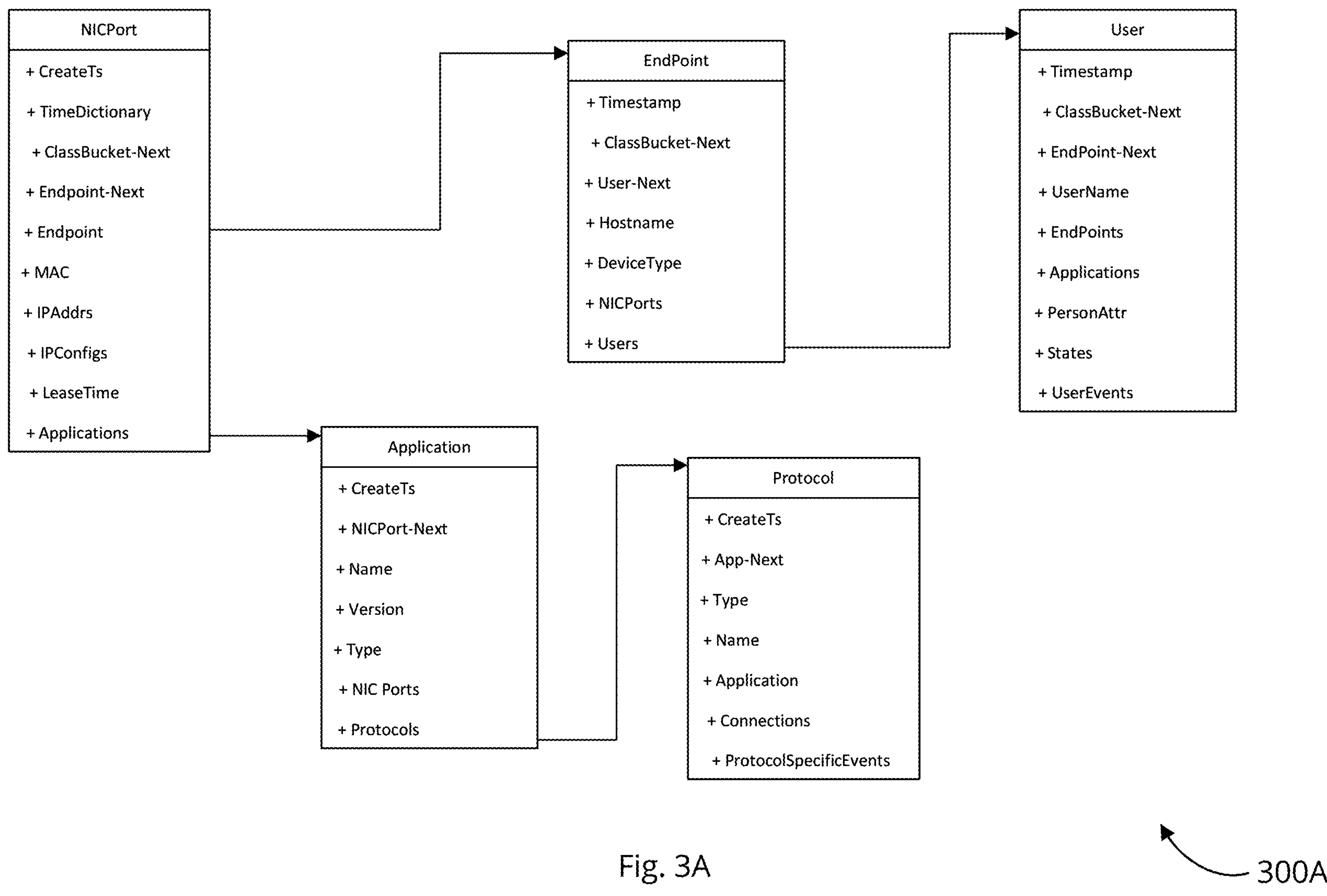
FIG. 3A is a schematic diagram of an entity model, in accordance with various embodiments.

FIG. 3A is a schematic diagram of an entity model 300A, in accordance with various embodiments. The entity model 300A includes an example of an entity based on entity information extracted from a frame. Here the entity model 300A may comprise respective entities associated with a NIC port, application, endpoint, protocol, and user. Thus, the entity model 300A includes a NIC port as one entity, which may further be associated with one or more endpoints, including the depicted endpoint. The endpoint may, in turn, be associated with one or more users, including the depicted user. Similarly, the NIC port may be associated with one or more applications, including the application depicted. The application, in turn, may use a protocol (which may be part of one or more protocols associated with the application.

Accordingly, an entity may be defined by the set of endpoint information as depicted. For example, a NIC port may include a list of one or more associated endpoints, MAC addresses, IP addresses, IP configurations, lease time, associated applications, etc. It is to be understood that in other embodiments, additional or fewer entity information may be used to define an entity. For example, additional entity information in the entity model 300A may include, without limitation, IP configuration, VLAN identification (VLAN ID), user state, personal attributes (e.g., first name, last name, title, organization, etc.), files used by an application, etc. In further examples, the entity model 300A may include additional entities, defined similarly by a set of entity information.

Figure 3B:
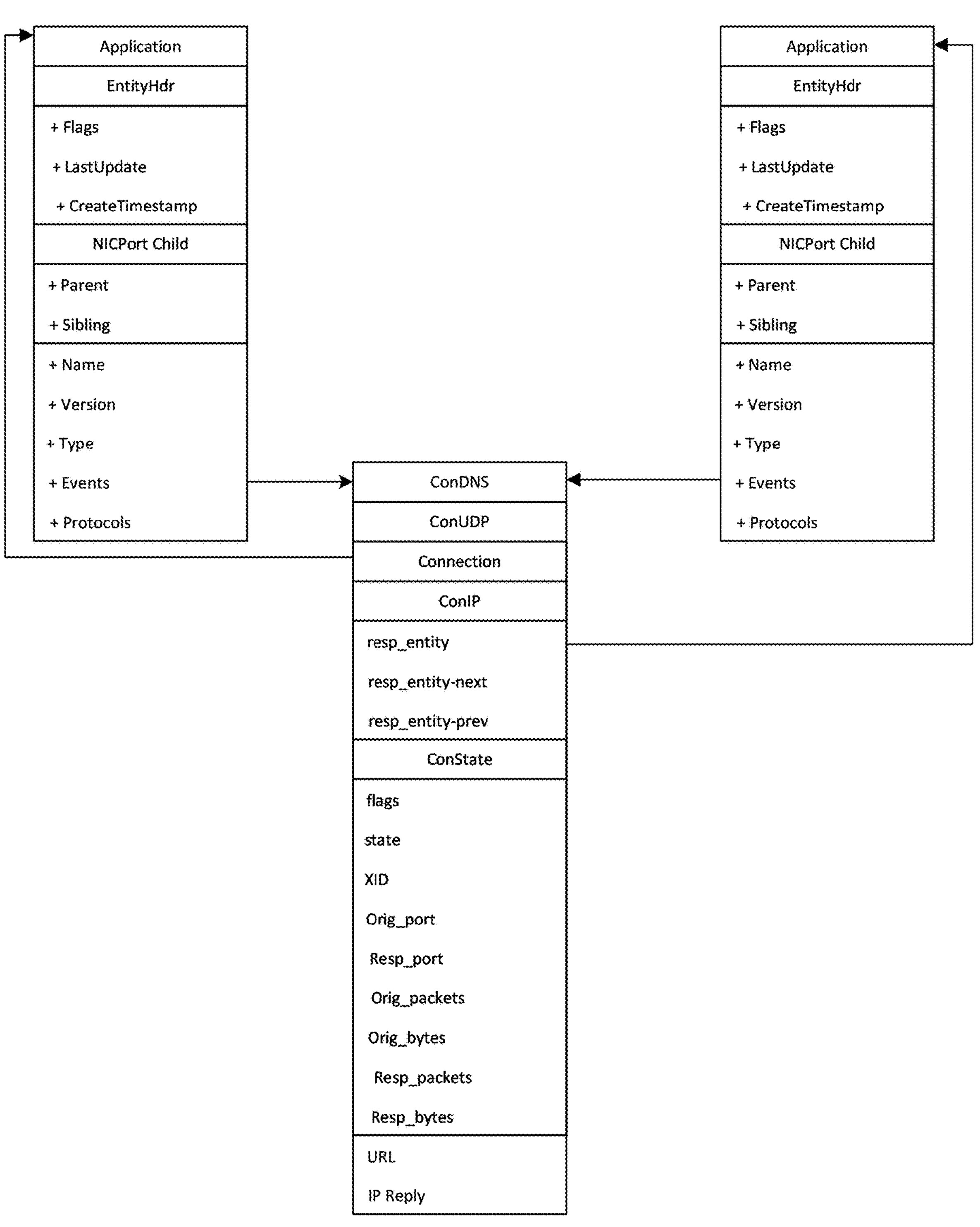
FIG. 3B is a schematic diagram of an event model, in accordance with various embodiments.

FIG. 3B is a schematic diagram of an event model 300B, in accordance with various embodiments. The event model 300B depicts an example of a single event as defined by a connection or interaction between two or more entities. Specifically, the event model 300B includes respective applications indicating an entity header, NIC port of a child entity, and event indicating a DNS connection (e.g., a connection to a DNS server). The DNS connection event (ConDNS) may include IP connection information (such as a response entity), and connection state information (such as originating port, response port, originating packets, response packets, etc.). In some embodiments, the first application entity may be a DNS client application entity, to which the connection field of the ConDNS event points. The second application may be a DNS server application entity, to which the response entity field of the ConDNS event points.

Accordingly, an event may be defined by information regarding a connection between entities, or generated from a single entity, as previously described. It is to be understood that in other embodiments, additional or fewer entity information may be used to define an event. For example, additional event information in the event model 300B may include, without limitation, various types of connection events, such as a DHCP connection, HTTP connection, SMB connection, UDP connection, TCP connection, secure shell (SSH) connection, network time protocol (NTP), transport layer security (TLS) connection, or QUIC connection, among others. In some examples, the event model may further include an object for an event inventory, in of different connection types. In some examples, the event inventory may be a lookup table in the event model.

Figure 3C:
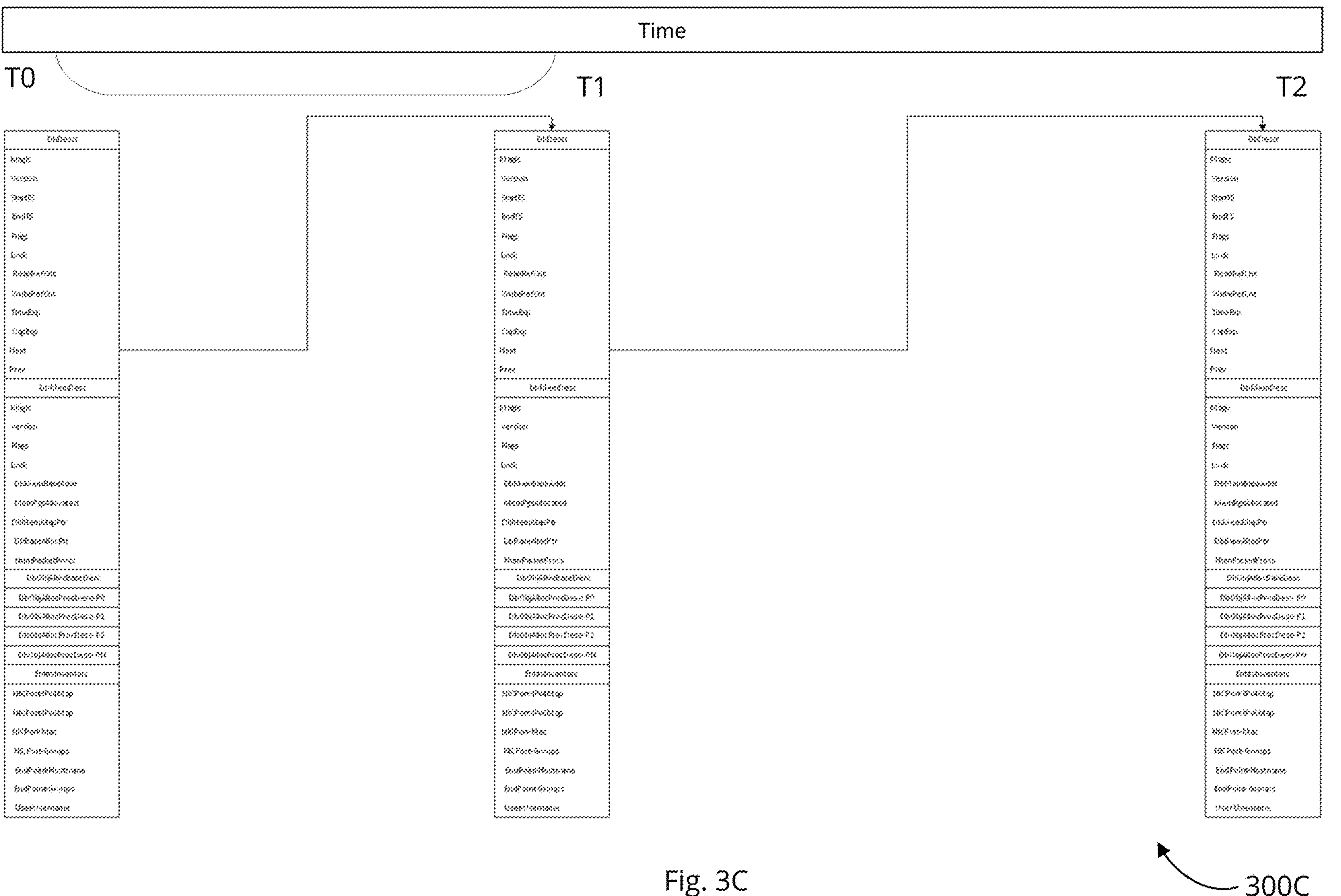
FIG. 3C is a schematic diagram of a time model for a database of entity and event models, in accordance with various embodiments.

FIG. 3C is a schematic diagram of a time model 300C for a database of entity and event models, in accordance with various embodiments. The time model 300C depicts an example of a database object over time. The database object may include a database description, memory description (e.g., associated memory addresses such as a base address, memory pages allocated, memory mapping pointer, base allocation pointer, etc.), and an entity inventory. In other embodiments, other information may be included and/or information may be excluded from that shown. For example, suitable information may include an event inventory object, application object, lookup table object (e.g., a lookup table for MAC addresses, endpoints, groups, etc.), an entity object, etc.

In various embodiments, time is managed by creating a database to cover a time period (e.g., T0 to T1, T1 to T2, etc.). All entities and events generated across this time period is contained within the database (e.g., database object). Once a database time or capacity has reached the configured limit, a new database may be created having a new inventory of entities and events. This enables each database to represent a standalone piece of time.

Figure 3D:
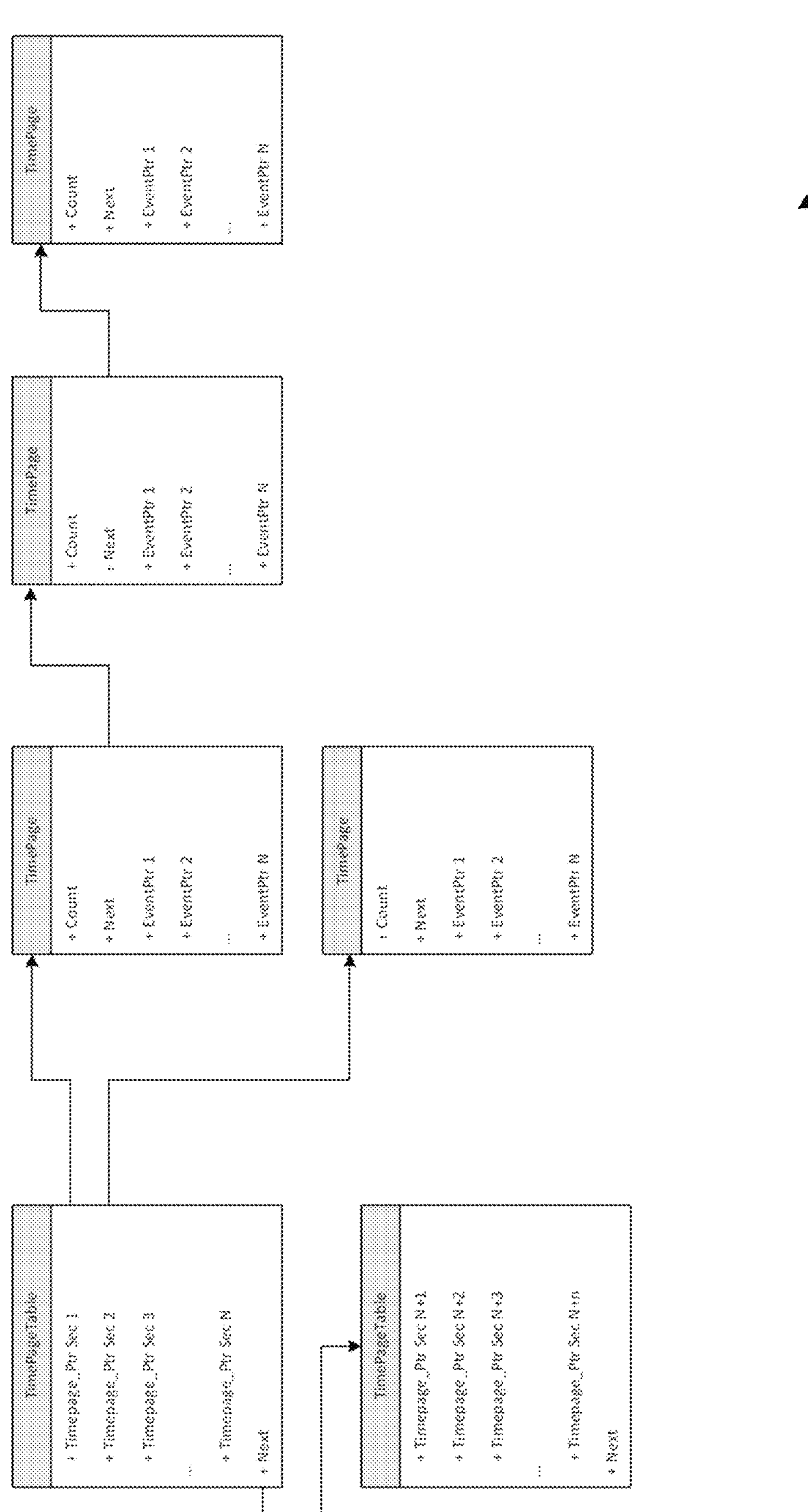
FIG. 3D is a schematic diagram of a time page list model for events, in accordance with various embodiments.

FIG. 3D is a schematic diagram of a time page list model 300D for events, in accordance with various embodiments. The time page list model 300D includes one or more time page tables, each time page table including a plurality of timepage pointer sections (Timepage_PtrSec1 through Timepage_PtrSecN). Each timepage pointer section may include one or more time pages (TimePage) comprising one or more event pointers associated with a specific timestamp, and a connection to a subsequent time page associated with a subsequent timestamp. Each respective time page table may be associated with a respective time period (e.g., 1 second).

In some examples, several databases are kept in memory simultaneously and have the ability to refer to each other. Each packet processing thread keeps track of time by using a time page list model 300D where each event is linked in time as they are created and also linked to shared objects. This facilitates the ability to find an event by shared object as well as by time of occurrence.

Time is managed in each packet processing thread independently by creating a database a timePageTable that covers a time period (usually 1 sec).

Each entry points to a list of TimePages that holds N entries of event pointers for that time period. As events are generated during packet processing, they are added to the appropriate TimePage.

Figure 4:
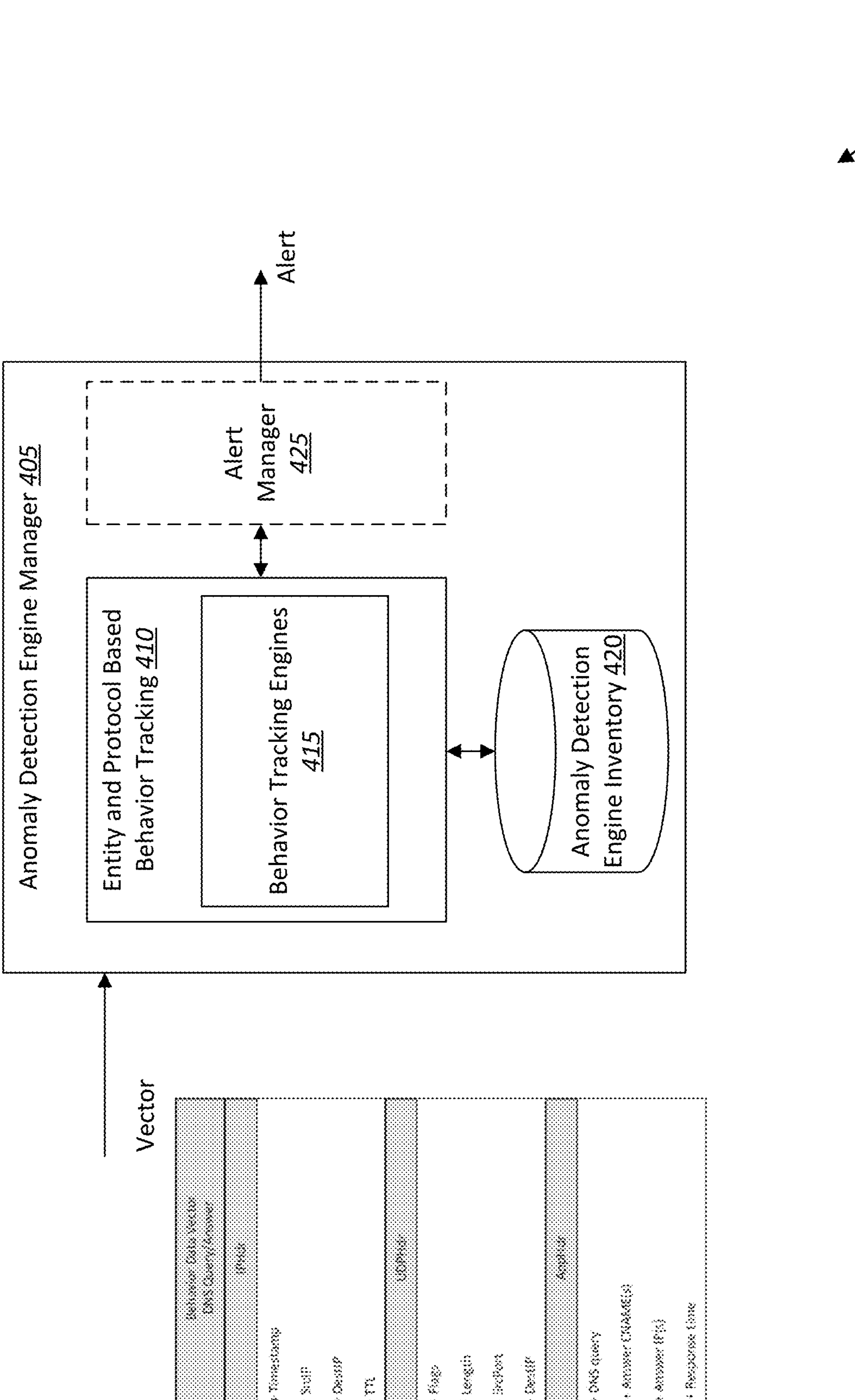
FIG. 4 is a schematic diagram of an anomaly detection logic, in accordance with various embodiments.

FIG. 4 is a schematic diagram of anomaly detection logic 400 in the packet analytics architecture, in accordance with various embodiments. The anomaly detection logic 400 includes an anomaly detection engine manager 405, behavior tracking logic 410, behavior tracking engines 415, anomaly detection engine inventory 420, and alert manager 425. It should be noted that the various components of the logic 400 are schematically illustrated in FIG. 4, and that modifications to the various components and other arrangements of the logic 400 may be possible and in accordance with the various embodiments.

In various examples, a respective machine learning model may be trained for each type of entity and event, present in the monitored network. For example, a machine learning model may be trained for respective entities, such as various endpoints and devices as previously described (e.g., a web browser, user, application, wireless device, server, etc.), and events such as DNS, SMB, HTTP, IP, TLS, or SMTP connections, to create train a model that tracks behavior of different entities and/or events on the network.

According to various examples, in operation, when a vector is received, the vector may be directed, via the anomaly detection engine manager, to the appropriate ML engine. As previously described, vectors are created by the packet processing logic based on entity and conversation context in the database. Vector contains a set of features selected to identify behavior as outlined, in one example, in the MITRE ATT&CK framework.

This multidimensional vector may be fed to a specific ML engine based on a ruleset to match specific behavior tracking. Each ML engine may be selected from the anomaly detection engine inventory 420, via the behavior tracking logic 410, to track and map the behavior of the data set sent to it. In one example, a DNS reply packet may generate a vector (e.g., behavior data vector) that would be fed into a "DNS Server behavior engine." Similarly, behavior data vectors from packets returning from a SMB server would be fed into a "SMB Server behavior engine."

The behavior tracking ML engines 415 may use clustering algorithms to map out a baseline behavior in an unsupervised mode utilizing the live traffic in the network it is learning. Once baseline is established, the respective ML engines may be set to inference mode and anomalies may be identified and brought to user as an anomaly alert, for example, generated by alert manager 425.

In some examples, the alert highlights the anomaly vector and the specific dimension(s) that are identified as anomalies. A user may review anomaly and either accept or reject the anomaly as a new baseline.

Figure 5:
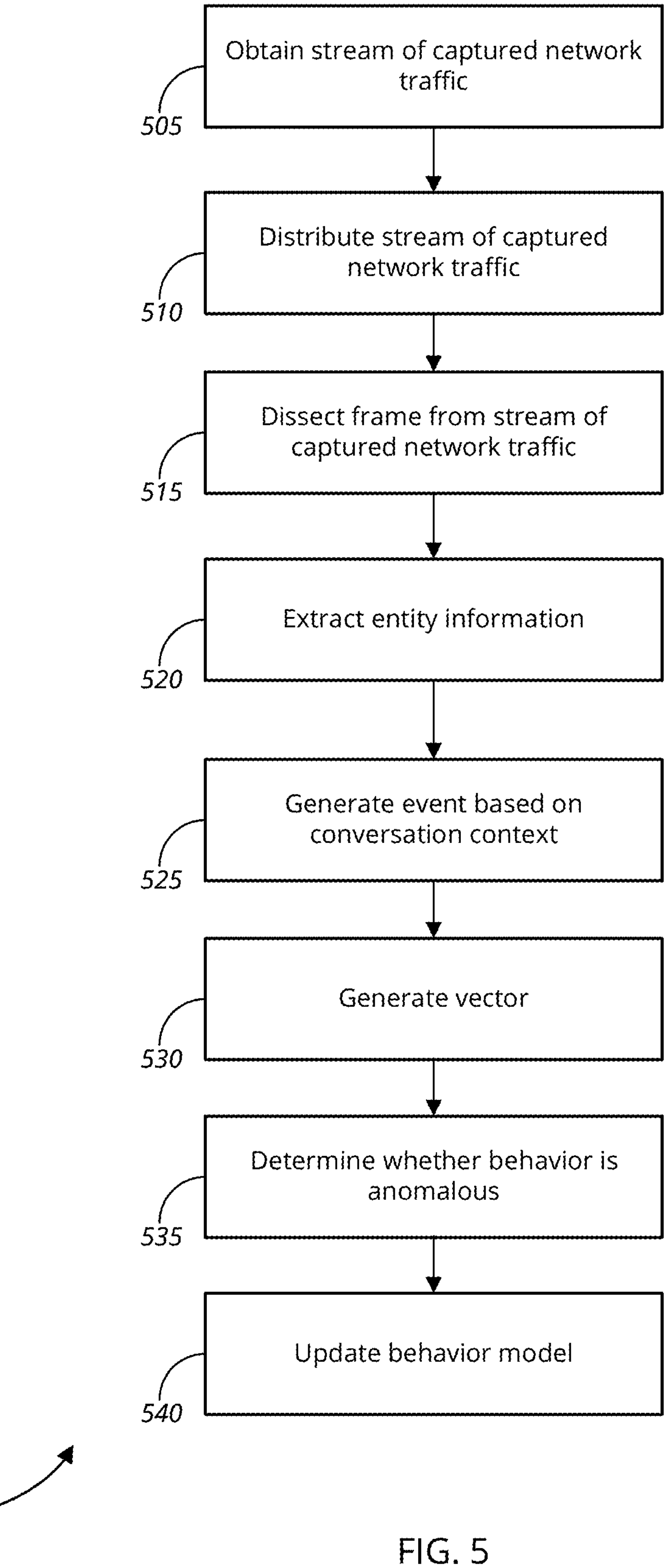
FIG. 5 is a flow diagram of a method of operation of an architecture for network entity and event models, in accordance with various embodiments.

FIG. 5 is a flow diagram of a method 500 of implementing an entity and event model. The method 500 includes, at block 505, obtaining a stream of captured network traffic. As previously described, traffic communicated over a network (e.g., internal to the network and/or originating from a source that is external to the network) may be captured. In some examples, the captured network traffic may be stored as PCAP files on a storage device, which may store one or more data streams concurrently, and further, may provide one or more PCAP streams in parallel. Accordingly, in various embodiments, packet analytics logic may obtain one or more streams of captured network traffic in parallel. In some examples, the streams of captured network traffic include PCAP streams. In some examples, the PCAP files may be decoded (also referred to as PCAP extraction) to obtain the raw packet data, metadata (e.g., events, logs, flows), and/or conversation context associated with the packet.

At block 510, the method 500 continues by distributing the stream of captured network traffic for packet processing. As previously described, packet analytics logic may include one or more packet load balancers configured to distribute streams of captured network traffic (e.g., PCAP streams) to respective packet processors. In some embodiments, the packet load balancers may distribute the streams of captured network traffic according to a distribution scheme (e.g., evenly among the one or more packet processors).

At block 515, the method 500 continues by dissecting a frame from the stream of the captured network traffic. As previously described, a packet processor may be configured to dissect a frame of captured network traffic (e.g., an extracted PCAP frame). The packet processor may be configured to dissect the frame and/or packet of captured network traffic. In some examples, the packet processor may dissect an Ethernet frame via Ethernet frame dissector (e.g., logic configured to dissect an Ethernet frame) to produce an IP frame, which may further be dissected via the IP frame dissector (e.g., logic configured to dissect an IP frame) to produce a TCP/UDP frame, which may in turn be dissected via the TCP/UDP dissector to produce an app frame (e.g., application-layer frame), which may in turn be dissected via the app dissector to produce the data packet. Thus, dissection of the packet is performed based on the protocols in the frame and/or packet.

The method 500 continues, at block 520, by extracting entity information at each layer of the dissected frame and/or packet. As previously described, as the frame is dissected, protocol specific information is extracted to identify the entities associated in the packet via entity identification and extraction logic. As the entities are identified, they are added to the entity inventory database, for example, via a memory page allocator which may place the entity in shared memory space via shared object allocator.

In some embodiments, entity identification may include extracting entity information from a packet. The packet may be captured from training data (e.g., historic traffic flow records, a pre-existing data set, etc.), or captured as raw packet data in real-time (e.g., real-time network traffic). The captured packets, as previously described, may be stored as compressed PCAP files. Entity information is information that is extracted from the packet that is associated with an entity. For example, entity information may include, without limitation, a media access control (MAC) address, NIC port, endpoint (e.g., a network endpoint, such as a user equipment, modem, gateway, switch, router, etc.) and endpoint configuration information, group information, user information (e.g., a user or username, etc.), VLAN information, IP configurations, applications, connection statistics (e.g., the number of clients connected, how long as entity been on the network, when the entity was first identified, timestamp information associated with the entity, etc.), application protocols, related network node information, and packet payload information. In further examples, entity information may include further information regarding the entity, and is not limited to any information or set of information.

In some examples, entities identified above may be stored in shared memory space. As previously described, shared memory space is a memory space where creation and manipulation of shared objects require synchronization at the object level. Shared objects (e.g., objects stored in shared memory space) are generally objects where there is only one instantiation over a longer time period (relative to per process objects), and is shared across several processes. Shared objects may include entities, or metadata tracking those entities.

At block 525, the method 500 continues by generating an event based on a conversation context. As previously described, events may be generated based on interactions between entities. For example, entity information extracted from packets may include entity information associated with multiple entities. For example, the entity information may indicate an originating entity and one or more destination entities (e.g., endpoints or other entity information associated with the destination). In further examples, a conversation context may be determined based on information from the packets. Conversation context may include, for example, information associating the packet with a particular entity (e.g., addresses, fingerprints, etc.), or information indicating context within an event (e.g., whether the packet is part of a request or response, etc.). Based on this information, an event may be generated between two or more entities. In various embodiments, an event may be defined based on a set of event information. Event information may include, without limitation, information about a connection event, such as a DNS connection, DHCP connection, HTTP connection, UDP connection, TCP connection, IP connection, SMB connection, NTP connection, TLS connection, and/or QUIC connection, as previously described.

In some examples, inspection rules may be matched against the packet to generate rule-based events (e.g., events may be generated by satisfying conditions of a rule). Events may then be stored in an event inventory, which itself may be stored in a per process memory space by the process object allocator.

In various embodiments, a conversation between two entities generates an event, via event generation, where entity information, entity state, and statistics associated with the conversation are used to identify the event. As events are created, they may be inserted into a process specific time model. The time model may be configured to facilitate identification of events across time. For each packet participating in a conversation, the conversation context is identified and updated. In some examples, inspection rules may be matched against the packet to generate rule-based events (e.g., events may be generated by satisfying conditions of a rule). Events may then be stored in an event inventory, which itself may be stored in a per process memory space by the process object allocator.

In some examples, events may be stored in per process memory space. As previously described, per process objects (e.g., objects stored in per process memory space) are generally objects that are created for a shorter time periods (relative to shared objects) and independent of the shared objects. Per process objects may include events generated by the behavior of the entities. In some examples, objects managed entirely by a respective packet processing thread may be allocated in a process specific memory block to avoid unnecessary locks to coordinate access. In other words, accessibility (e.g., management) of a per process object is exclusive to a single respective processing thread.

At block 530, the method 500 continues by generating a vector. As previously described, the vector may be a behavior vector created based on the conversation context, protocols, and entities involved. Thus, the features extracted from the frame and/or packet (or a subset of features) may be used to generate the vector (e.g., a behavioral vector) via data vectorization. In some examples, feature extraction from the frame and/or packet may include filtering of features before construction of an m-dimensional vector.

In some examples, each entity type may be assigned and stored with a select set of features meaningful for that entity (or group of entities), and each packet may then vectorized into an m-dimensional vector (e.g., m-number of features). In some embodiments, packets are classified and stored by protocol and entity, with each packet subsequently vectorized and assigned a cluster ID.

The method 500, at block 535, continues by determining whether behavior is anomalous. As previously described, each frame and its embedded networking protocols such as IP, TCP, UDP, and application specific protocols, such as HTTP, HTML, DNS, etc., may have a standardized set of header fields that define such characteristics as length of the packet, source and destination IP addresses, protocol and application use. By identifying and associating traffic with a specific entity or group of entities (e.g., an entity type), traffic can similarly be separated and stored in different types with similar behavior.

In some examples, one or more initial databases may be set up to store network traffic (e.g., packets) as packets enter the network. The one or more databases may be able to receive and store the one or more packets in parallel. The one or more databases may be set up to be baseline "normal," or non-anomalous, traffic data and as new data or new traffic enters the network, the new data, and specifically, vectors as generated above, may be compared against the data contained in the databases to detect anomalous network traffic.

The method 500 includes, at block 540, updating a behavior model. Specifically, if traffic is found not to be anomalous, behavior associated with the packet (e.g., entity and event) may be used to update a behavior model database (e.g., an entity model and/or event model). As previously described, when storing the data in the databases, the packets and/or data associated with the packets may be stored based on (1) entity and (2) events (e.g., conversations, communications, etc.) that occur between entity types. The packets and/or data may also be stored with a timestamp. In some examples, the databases identify all entity types (e.g., software, endpoints (e.g., devices), applications, websites, etc.) that are communicating with each other via the packet data and store the packets and/or data based on entity type and event. The one or more events between entity types might create an event timeline of all communicating entities and actions that occurred within a conversation between entities.

In various embodiments, one or more databases may be continuously created as new network traffic enters the network to create one or more new baselines. As storage is used up in the one or more databases, the older traffic data may be deleted or removed to create new storage data and a new baseline. The one or more databases that are created based on entity and conversations between entity types may be used as the baseline to detect anomalous traffic with the network.

In some cases, the packets may be stored separately from the entity, event, and/or entity behavior (which may be a combination of entity type and event) information associated with the one or more packets. The entity type, event, and/or behavior (e.g., a combination of entity and event information) may be stored in reference to the packet data so that if an anomalous entity, anomalous event, and/or anomalous behavior is detected, the packets can be retrieved for further analysis.

Figure 6:
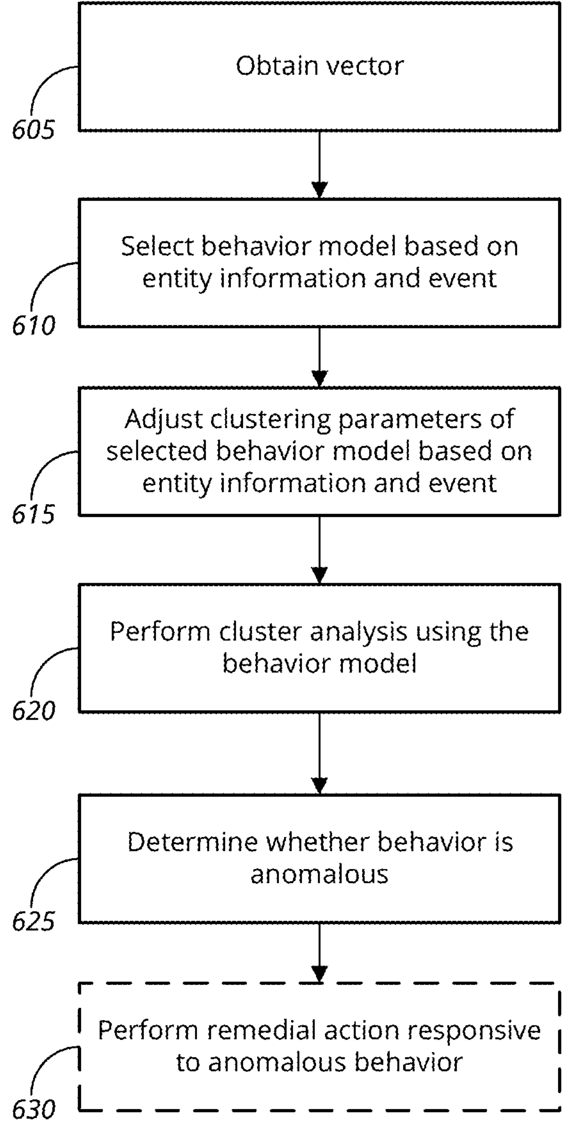
FIG. 6 is a flow diagram of a method of network anomaly detection, in accordance with various embodiments.
Figure 6:

FIG. 6 is a flow diagram of a method 600 of network anomaly detection. The method 600 includes, at block 605, obtaining a vector from packet analytics logic. As previously described, a vector may be an m-dimensional vector with m-number of features, the features corresponding to entity information and/or an event, and context regarding the event (e.g., context of a conversation between entities).

At block 610, the method 600 continues by selecting a behavior model based on entity information and/or an event. Specifically, as previously described, the multidimensional vector may be fed to a specific ML engine based on a ruleset to match specific behavior tracking. Each ML engine may be selected from the anomaly detection engine inventory. In one example, a DNS reply packet may generate a vector (e.g., behavior data vector) that would be fed to a "DNS server behavior engine." Similarly, behavior data vectors from packets returning from a SMB server would be fed into a "SMB server behavior engine," and so on. In various examples, the ML engine inventory may include a plurality of ML engines that are trained on training data and/or captured network traffic for different types of behavior models, as previously described.

At block 615, the method 600 continues by adjusting clustering parameters of a selected behavior model based on entity information and/or event. As previously described, the anomaly detection logic may be configured to dynamically determine and adjust clustering parameters of a selected ML engine. Clustering parameters may include cluster counts (e.g., a total number of clusters in the ML engine for a clustering algorithm). In further examples, the anomaly detection logic may further be configured to tune hyperparameters (as previously described) of the respective ML engine as further complexity is discovered in the captured network traffic.

The method 600 continues, at block 620, by performing cluster analysis using the behavior model. As previously described, the one or more ML engines may utilize a clustering algorithm. Specifically, the ML model may compare the generated vector to trained vector clusters for the given event and/or entity. Thus, the clustering algorithm may group similar vectors together into clusters, and use the clusters to identify "normal" or expected behavior in the network traffic involving a given the event and/or entity associated with a respective packet. The parameters of the clustering algorithm, as described above, may be dynamically adjusted based on a given behavior vector. In other embodiments, the ML engine may utilize a neural network for clustering, such as a multilayer perceptron (MLP), feed-forward network, encoder-decoder (including autoencoder), or transformer based neural network architecture. In yet further embodiments, the ML engine may utilize a density-based spatial clustering of applications with noise (DBSCAN) or hierarchical DBSCAN (HDBSCAN), k-single value decomposition (SVD) clustering, k-means clustering, or a hierarchical clustering algorithm, such as Agglomerative Clustering or Divisive Clustering. It is to be understood that the clustering algorithm is not limited to any single algorithmic approach, and suitable alternative algorithms may be used in other embodiments.

At block 625, the method 600 continues by determining whether detected behavior (e.g., as defined in the behavior vector) is anomalous. If it is determined that vector does not fall within normal or expected ranges from the "normal" cluster, the behavior (e.g., vector) or packet associated with the vector may be flagged as being anomalous.

At block 630, the method 600 continues by performing a remedial action responsive to a determination that the behavior is anomalous. As previously described, if it is determined that detected behavior is anomalous, the remedial action may include generating and transmitting an alert to a user of the anomaly detection and/or monitoring system. In further examples, other remedial actions may be utilized. For example, remedial actions may be determined according to one or more rules.

Figure 7:
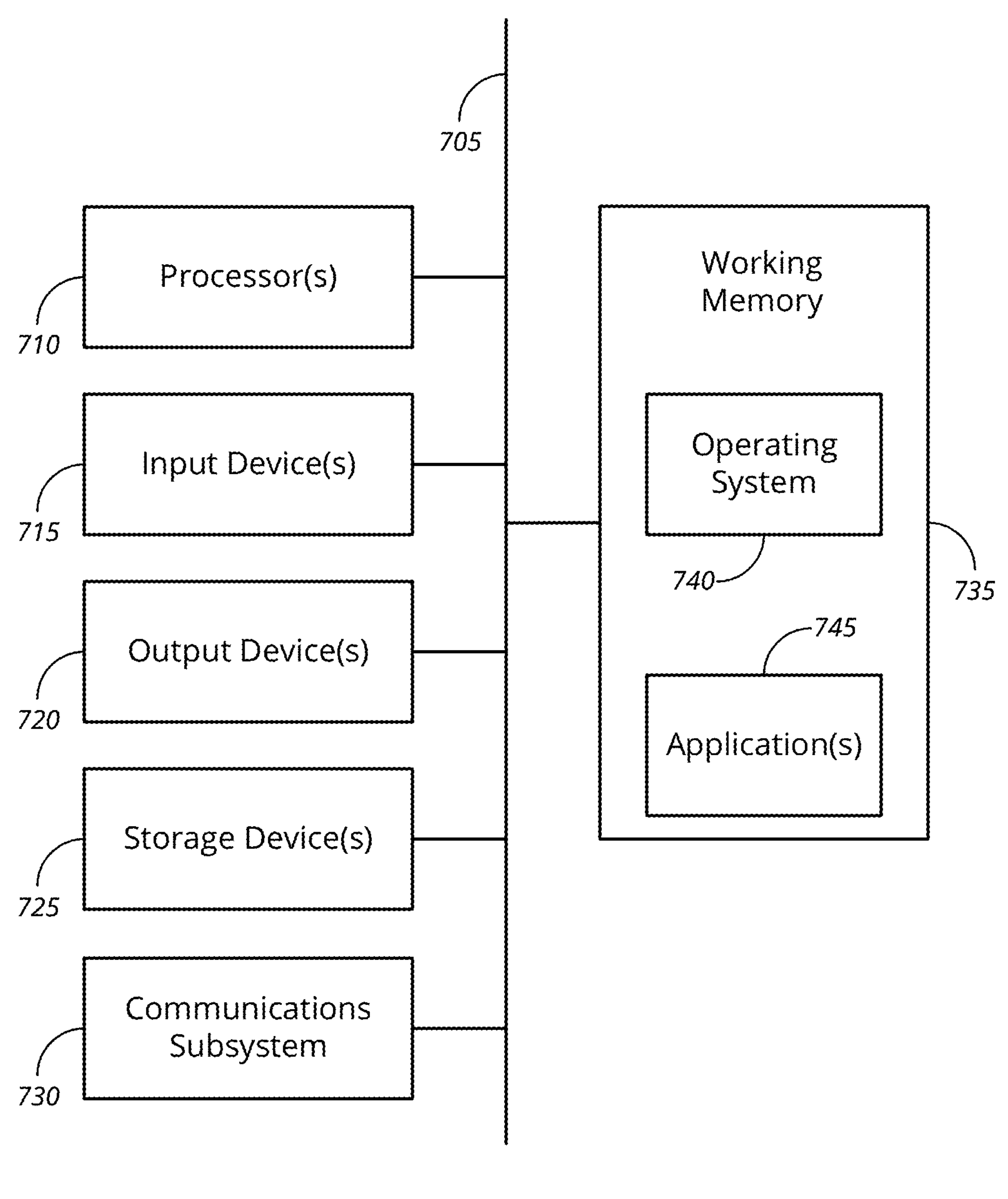
FIG. 7 is a schematic block diagram of a computer system for network anomaly detection, in accordance with various embodiments.

FIG. 7 is a schematic block diagram of a computer system 700 for network anomaly detection, in accordance with various embodiments. FIG. 7 provides a schematic illustration of one embodiment of a computer system 700, such as the systems 100, 200A, 200B, and 400 or subsystems thereof, which may perform the methods provided by various other embodiments, as described herein. It should be noted that FIG. 7 only provides a generalized illustration of various components, of which one or more of each may be utilized as appropriate. FIG. 7, therefore, broadly illustrates how individual system elements may be implemented in a relatively separated or relatively more integrated manner.

The computer system 700 includes multiple hardware elements that may be electrically coupled via a bus 705 (or may otherwise be in communication, as appropriate). The hardware elements may include one or more processors 710, including, without limitation, one or more general-purpose processors and/or one or more special-purpose processors (such as microprocessors, digital signal processing chips, graphics acceleration processors, and microcontrollers); one or more input devices 715, which include, without limitation, a mouse, a keyboard, one or more sensors, and/or the like; and one or more output devices 720, which can include, without limitation, a display device, and/or the like.

The computer system 700 may further include (and/or be in communication with) one or more storage devices 725, which can comprise, without limitation, local and/or network accessible storage, and/or can include, without limitation, a disk drive, a drive array, an optical storage device, solid-state storage device such as a random-access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer system 700 might also include a communications subsystem 730, which may include, without limitation, a modem, one or more radios, transceivers, a network card (wireless or wired), an IR communication device, a wireless communication device and/or chipset (such as a Bluetooth™ device, an 802.11 device, a WiFi device, a WiMax device, a WWAN device, a Z-Wave device, a ZigBee device, cellular communication facilities, a wireless integrated circuit (IC) device, etc.), and/or a low-power wireless device. The communications subsystem 730 may permit data to be exchanged with a network (such as the network described below, to name one example), with other computer or hardware systems, between data centers or different cloud platforms, and/or with any other devices described herein. In many embodiments, the computer system 700 further comprises a working memory 735, which can include a RAM or ROM device, as described above.

The computer system 700 also may comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 725 described above. In some cases, the storage medium might be incorporated within a computer system, such as the system 700. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, single board computers, FPGAs, ASICs, system on a chip (SoC), or other custom IC) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer readable medium, such as one or more of the storage device(s) 725. Merely by way of example, execution of the sequences of instructions contained in the working memory 735 might cause the processor(s) 710 to perform one or more procedures of the methods described herein.

The terms "machine readable medium" and "computer readable medium," as used herein, refer to any medium that participates in providing data that causes a machine to operate in a specific fashion. In an embodiment implemented using the computer system 700, various computer readable media might be involved in providing instructions/code to processor(s) 710 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 725. Volatile media includes, without limitation, dynamic memory, such as the working memory 735. In some alternative embodiments, a computer readable medium may take the form of transmission media, which includes, without limitation, coaxial cables, copper wire and fiber optics, including the wires that comprise the bus 705, as well as the various components of the communication subsystem 730 (and/or the media by which the communications subsystem 730 provides communication with other devices). In an alternative set of embodiments, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700. These signals, which might be in the form of electromagnetic signals, acoustic signals, optical signals, and/or the like, are all examples of carrier waves on which instructions can be encoded, in accordance with various embodiments of the invention.

The communications subsystem 730 (and/or components thereof) generally receives the signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a storage device 725 either before or after execution by the processor(s) 710.

While some features and aspects have been described with respect to the embodiments, one skilled in the art will recognize that numerous modifications are possible. For example, the methods and processes described herein may be implemented using hardware components, custom integrated circuits (ICs), programmable logic, and/or any combination thereof. Further, while various methods and processes described herein may be described with respect to particular structural and/or functional components for ease of description, methods provided by various embodiments are not limited to any particular structural and/or functional architecture but instead can be implemented in any suitable hardware configuration. Similarly, while some functionality is ascribed to one or more system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with or without some features for ease of description and to illustrate aspects of those embodiments, the various components and/or features described herein with respect to a particular embodiment can be substituted, added and/or subtracted from among other described embodiments, unless the context dictates otherwise. Consequently, although several embodiments are described above, it will be appreciated that the invention is intended to cover all modifications and equivalents within the scope of the following claims.

What is claimed is:

1. A system comprising:

at least one processor; and a non-transitory computer readable medium in communication with the processor, the non-transitory computer readable medium having encoded thereon a set of instructions executable by the processor to:

obtain a stream of captured network traffic;

extract entity information from the captured network traffic;

store the entity information associated in a shared memory space accessible by multiple processing threads;

generate an event based on the entity information extracted from the captured network traffic;

store the event in per process memory space different from the shared memory space, wherein the event in the per process memory space is accessible by a single respective processing thread of the multiple processing threads without synchronization of access between the multiple processing threads;

generate a vector based, at least in part, on the entity information and the event; and determine whether at least part of the captured network traffic is anomalous.

2. The system of claim 1, wherein the set of instructions is further executable by the processor to:

update a behavior model based on the vector, wherein the behavior model includes one or more clusters of vectors associated with a type of entity.

3. The system of claim 2, wherein the type of entity includes at least one of an endpoint or an application, each entity defined by a set of entity information.

4. The system of claim 1, wherein the stream of captured network traffic is a packet capture (PCAP) stream.

5. The system of claim 1, wherein the vector is generated based on a set of features, the set of features selected from the entity information and the event.

6. The system of claim 1, wherein entity information includes one or more of a media access control address, network address, NIC port, endpoint configuration information, user information, connection statistics, and application protocol-specific information.

7. The system of claim 1, wherein extracting entity information from the captured network traffic further comprises:

dissecting a frame of the captured network traffic at each layer; and extracting protocol information at each layer of the frame.

8. The system of claim 1, wherein the set of instructions is further executable by the processor to:

identify an entity based, at least in part, on the entity information, wherein identifying the entity comprises matching at least part of the entity information extracted from the captured network traffic with at least part of a set of entity information associated with the entity in an entity model, the entity model including entities known to be in a network from which the captured network traffic was captured.

9. A non-transitory computer readable medium in communication with a processor, the non-transitory computer readable medium having encoded thereon a set of instructions executable by the processor to:

obtain a stream of captured network traffic;

extract entity information from the captured network traffic;

store the entity information associated in a shared memory space accessible by multiple processing threads;

generate an event based on the entity information extracted from the captured network traffic;

store the event in per process memory space different from the shared memory space, wherein the event in the per process memory space is accessible by a single respective processing thread of the multiple processing threads without synchronization of access between the multiple processing threads;

generate a vector based, at least in part, on the entity information and event; and determine whether at least part of the captured network traffic is anomalous.

10. The non-transitory computer readable medium of claim 9, wherein the set of instructions is further executable by the processor to:

update a behavior model based on the vector, wherein the behavior model includes one or more clusters of vectors associated with a type of entity.

11. The non-transitory computer readable medium of claim 10, wherein the type of entity includes at least one of an endpoint or an application, each entity defined by a set of entity information.

12. The non-transitory computer readable medium of claim 9, wherein the vector is generated based on a set of features, the set of features selected from the entity information and the event.

13. The non-transitory computer readable medium of claim 9, wherein entity information includes one or more of a media access control address, network address, NIC port, endpoint configuration information, user information, connection statistics, and application protocol.

14. The non-transitory computer readable medium of claim 9, wherein extracting entity information from the captured network traffic further comprises:

dissecting a frame of the captured network traffic at each layer; and extracting protocol information at each layer of the frame.

15. The non-transitory computer readable medium of claim 9, wherein the set of instructions is further executable by the processor to:

identify an entity based, at least in part, on the entity information, wherein identifying the entity comprises matching at least part of the entity information extracted from the captured network traffic with at least part of a set of entity information associated with the entity in an entity model, the entity model including entities known to be in a network from which the captured network traffic was captured.

16. A method comprising:

obtaining a stream of captured network traffic;

extracting entity information from the captured network traffic;

storing the entity information associated in a shared memory space accessible by multiple processing threads;

generating an event based on the entity information extracted from the captured network traffic;

store the event in per process memory space different from the shared memory space, wherein the event in the per process memory space is accessible by a single respective processing thread of the multiple processing threads without synchronization of access between the multiple processing threads; and generating a vector based, at least in part, on the entity information and event; and determining whether at least part of the captured network traffic is anomalous.

17. The method of claim 16, further comprising:

identify an entity based, at least in part, on the entity information, wherein identifying the entity comprises matching at least part of the entity information extracted from the captured network traffic with at least part of a set of entity information associated with the entity in an entity model, the entity model including entities known to be in a network from which the captured network traffic was captured.

18. The method of claim 16, wherein the captured network traffic includes one or more packet frames.

19. The method of claim 16, further including dissecting at least one packet frame at a plurality of protocol layers and extracting protocol information at each layer and, based on the extracted protocol information, identify an entity by matching at least part of extracted entity information to an entity model including entities known to be in a network.

20. The method of claim 16, wherein generating the event based on the entity information extracted from the captured network traffic comprises determining whether one or more packet frames are associated with a conversation between entities, based on a determination the one or more packet frames are associated with the conversation between entities, maintain a conversation context and generate an event based on the conversation context.

* * * * *